Aug. 4, 1959  N. MALZ ET AL  2,897,862
LIQUIFIER
Original Filed April 5, 1951  2 Sheets-Sheet 1

Inventors:
Nickolas Malz
Raymond J. Braski
By: *Watson W. Harbaugh*
Atty's.

Aug. 4, 1959   N. MALZ ET AL   2,897,862
LIQUIFIER
Original Filed April 5, 1951   2 Sheets-Sheet 2
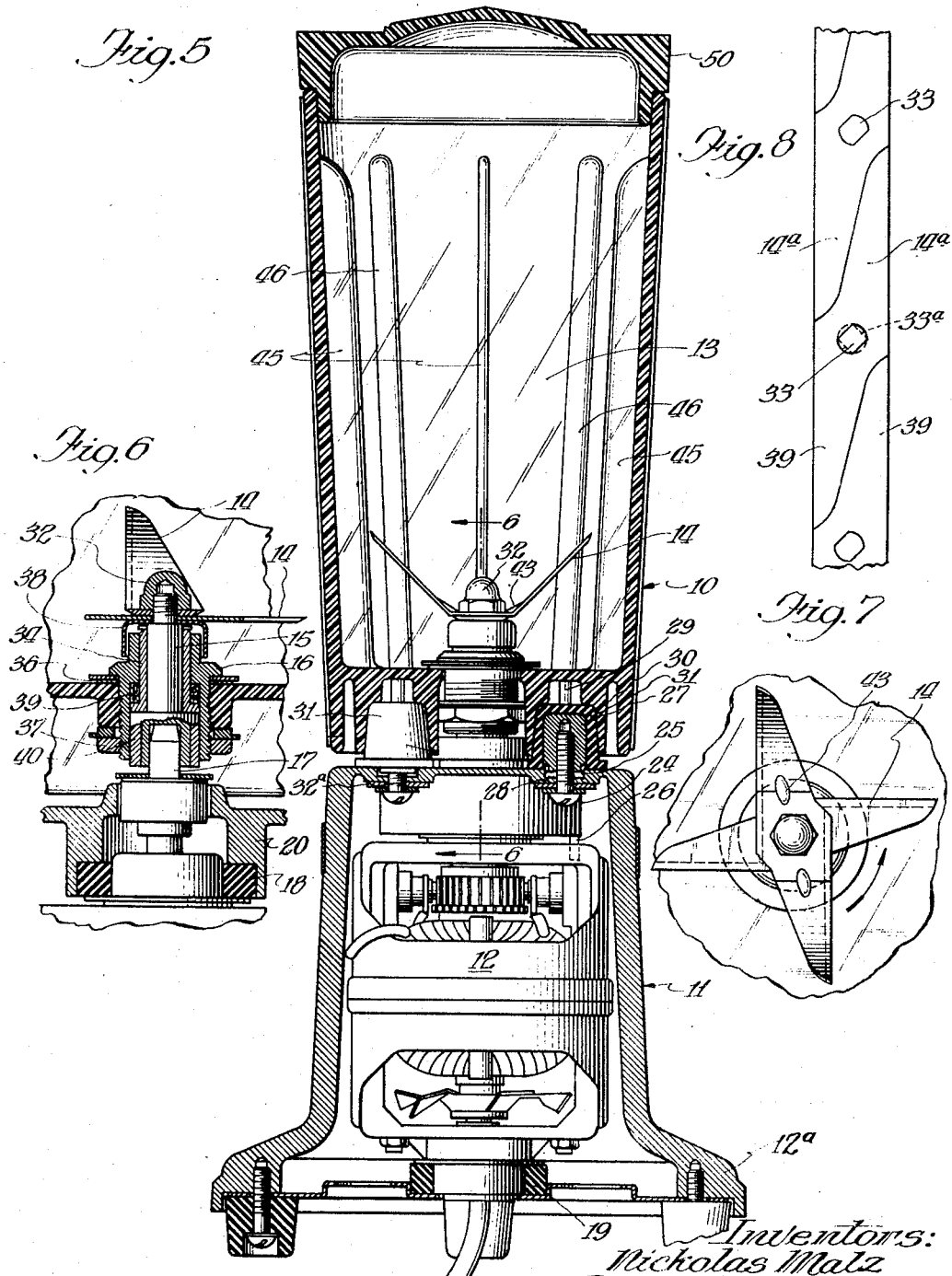
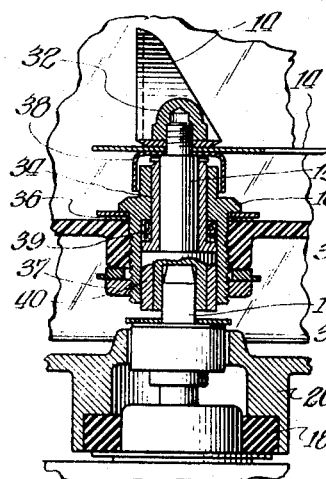
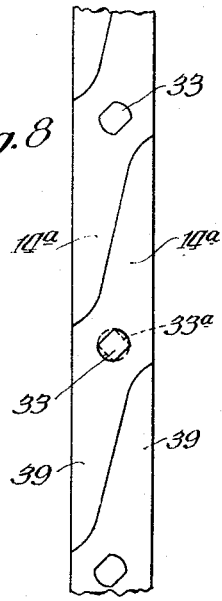
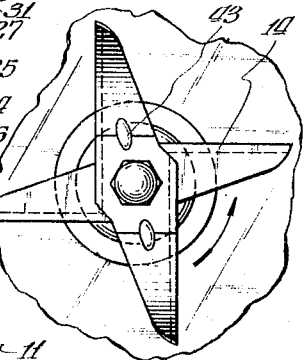
Inventors:
Nicholas Malz
Raymond J. Braski
By: Watson D. Harbaugh
Atty's.

United States Patent Office 2,897,862
Patented Aug. 4, 1959

2,897,862

LIQUIFIER

Nickolas Malz, Chicago, Ill., and Raymond J. Braski, Grand Haven, Mich., assignors to Dormeyer Corporation, Chicago, Ill., a corporation of Illinois Original application April 5, 1951, Serial No. 219,366, now Patent No. 2,758,623, dated August 14, 1956. Divided and this application November 22, 1955, Serial No. 548,466

2 Claims. (Cl. 146—68)

The present invention relates generally to liquifiers of the type which act upon mixtures of liquids and solids to form liquid mixtures, the devices having whirling blades or knives which not only agitate and aerate the mixtures, but also serve to cut up the solid particles to reduce them to very small sizes capable of being suspended in the mixture.

This application is a division of our application Serial No. 219,366, now Patent No. 2,758,623, filed April. 5, 1951.

The device of this invention is intended primarily for use in the preparation of foods and beverages and it may be used to perform a variety of operations depending upon the manner in which it is operated and the substances involved. For example, it may be used to mix and aerate two different liquids, to form a suspension of a liquid in a solid either with or without aeration, or to simply render certain solids as liquid suspensions. Thus the liquifier may be used to convert vegetables or fruits into juices, to make soups, to make shakes of ice cream and liquids or to chop up ice into fine particles for cocktails and other beverages.

Liquifiers have been produced heretofore, but the prior devices have been difficult to operate in that they are or were hard to keep clean, likely to tip over or spill the contents during or after mixing, and were excessively noisy in operation and inefficient in cutting and agitating. Moreover the mountings of containers upon the motors heretofore have been such that the cutting and agitation space in the bottom of the container has been greatly curtailed and the mounting area quite narrow.

One important object of this invention is to provide a liquifier in which these defects are eliminated, the device being efficient and quiet in operation and unlikely to throw liquid out of the container during the comminuting action, particularly when filled to a depth approaching capacity.

Another object is to provide a liquifier which may be operated without alteration or change of parts either with aeration or without aeration of the mixture and in which the container and cutter blades cooperate to provide a slicing rather than a shattering action.

The invention is further characterized by a container construction which eliminates vortexing of the mixture when the container is filled above a predetermined level.

Other objects and advantages of the liquifier of this invention will present themselves to those familiar with the art on reading the following specification in conjunction with the drawings and the appended claims.

In the drawings:

Fig. 5 is an enlarged, vertical sectional view taken along the line 5—5 of Fig. 1.

Fig. 6 is a further enlarged, broken vertical sectional view taken along the line 6—6 of Fig. 5.

Fig. 7 is an enlarged, broken top plan view of the rotating cutter blades.

Fig. 8 is an enlarged, broken top plan view of a blank from which the cutter blades are stamped.

Figure 1:
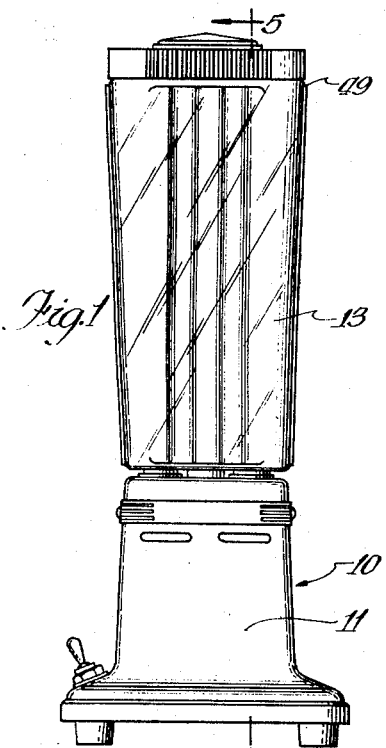
Fig. 1 is a side view in elevation of a liquifier embodying the invention.
Figure 2:
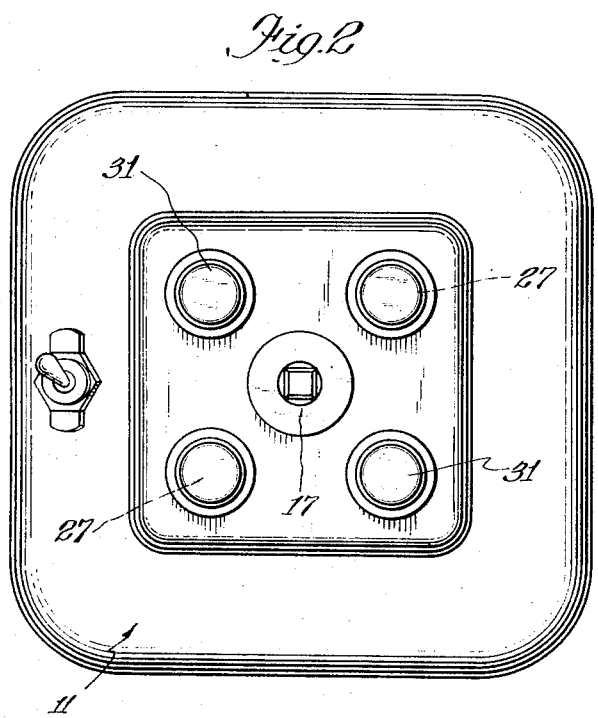
Fig. 2 is an enlarged, top plan view of the liquifier with the container removed to show the configuration of the base.
Figure 3:
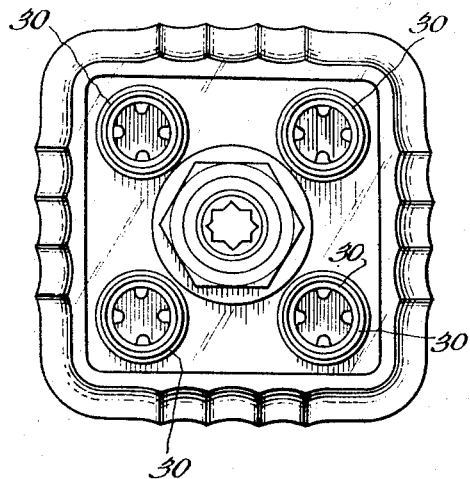
Fig. 3 is an enlarged, bottom plan view of the container shown in Fig. 1.

The liquifier 10 of this invention comprises a base 11, having an electric motor 12 therein, and a container 13 substantially square in sectional contour and made of a light plastic such as cellulose acetate, is removably supported on top of the base. Cutting blades 14, carried on a drive shaft 15 journalled in a bushing 16, are mounted in the bottom of the container. The shaft 15 is removably coupled to the motor shaft 17 in drive relationship. Thus the container 13 and the cutter assembly may be lifted from off the base 11 when it is desired either to pour the mix or to store the liquifier in a more compact space.

The base 11 is preferably formed from a unitary hollow die casting having a flaring lower portion 12a and an open bottom. The sectional shape of the base is generally square with rounded corners to conform to the mixing container 13. The electric motor 12 is axially supported by a pair of elastomer mounting rings 18 and 19 (Figs. 6 and 5 respectively), which are carried by the base 11, as shown, in a fixed vertical position and constrained thereby against substantial endwise or sidewise motion.

To support the container 13 in proper operative alignment with the motor 12, four hollow bosses 30 are provided on the bottom of the container. These bosses receive nuts 27 covered with an elastomer 31 which are secured to the top of the base 11 by bolts 32a located in circular openings 25 provided in bosses 28 at the four corners of the top of the base.

The cutter blades 14 are rigidly supported on the upper end of the shaft 15 by an acorn nut 32. To secure the blades against turning with respect to the shaft 15, the sides of the shaft are machined flat and the blades are provided with flat sided mating holes 33. The shaft 15 in turn is journalled in a sleeve bearing 34 press fitted in the bushing 16 with a lubricant saturated wick 39 behind it, and the assembly is received in an opening in the bottom of the container 13. To prevent leakage, an elastomer gasket 36 is provided in the upper end of the bushing 16, the gasket being compressed by the action of a nut 37 which is threaded on the bottom of the bushing. To prevent leakage along the shaft 15 a close fit is maintained between the bearing 34 and the shaft 15 and in addition to this, hydrostatic pressure of the liquid on the bearing is removed during operation of the device by a bell or cup 38 provided beneath the blades 14 which projects downwardly over the top of the bushing 16. This bell turns with the blades 14 and centrifugates the liquid. Moreover, the cup 38 serves exactly as a diving bell to enclose a pocket of air at the upper end of the bearing under resting conditions to keep as much as possible of the liquid from contacting the bearing. Furthermore, the shaft is preferably made of stainless steel and the bearing of brass to eliminate rust and corrosion.

To hold the cutter assembly against axial movement, a shoulder 40 (Fig. 6) is provided on the shaft 15 at the lower end of the bearing surface. This shoulder prevents upward movement of the assembly while the cup 38 and blades 14 prevent downward movement.

The novel beater blade arrangement is significant from a manufacturing as well as a mixing and liquifying standpoint.

The blades on the lower cutter are shorter than those in the upper cutter but both are of the same general contour. After the blades 14 are stamped the upper cutter is die formed to the third dimensional shape shown in Figs. 4 through 7 in which the cutting ends slant upwardly at about 45°. The reversely upset portions indicated at 43 are provided to increase the strength of the blades at the bends.

By way of understanding the operation of the cutters it will be noted on examination of Fig. 5 that the cutting edges of the blades 14 are set at an angle of about twenty degrees to radii drawn through the mid points of the cutting edges. Because of this angular relationship the blades exert a slicing action as they engage solid particles in the mix as augmented by the outward movement which is imparted to the particles by centrifugal force as they are rotated by the blades. This is particularly important in the liquification of fibrous substances such as fruits or vegetables which cannot be cut readily without slicing.

On close examination of the drawings it will be noted that the cutting edges of the blades are beveled on the lower sides. This causes the mix to be drawn downwardly and outwardly by the cutter assembly making it unnecessary to pitch the blades. Moreover, the effect of the bevel is to increase the whirlpooling action in the mix in the lower portion of the container 13 and draw more air down into the mix thereby increasing the degree of aeration possible over that which would result with blades which were sharpened only on top or top and bottom.

Referring now to the mixing container 13, it is substantially square in section as already mentioned and diverges slightly outwardly, the top being somewhat larger than the bottom for molding purposes and the bottom members also being provided with adequate molding draft with the parting line just below the top as indicated at 49 (Fig. 1). In addition to cellulose acetate the container can be made of methacrylate so as to be virtually unbreakable, and it is preferred that the material be transparent so that the mix may be observed even when the cover 50 is in place. Actually the cover is not required for most mixing operations, but it is preferred so that with some mixtures, particularly in small quantities, material will not be splattered out of the container.

The inside of the container 13 is provided with four major ribs 45 (Figs. 4 and 5) which extend one on each side of the container substantially the full length of the container. Eight minor ribs 46 are provided intermediate the major ribs and the corners of the container. The function of the four major ribs in their broad concept is to counteract the whirlpooling action of the mix enough to prevent the mix from climbing the sides of the container above approximately the half way mark. By the time the mix goes that high on the walls, the major ribs have established a brake sufficiently strong to have the rising mix fall inwardly into the center. The secondary ribs assist in slowing down secondary whirlpooling which might develop in each of the four corners.

Under the intense action of the beaters whirlpooling of a desirable violence will occur at and slightly above the beater level, but above this the whirlpooling action is quickly arrested so that the mix, particularly if present in a small quantity, is quickly returned to the blades to accelerate the recurrence of blade contact above that conventionally present where much of the liquid is spread upwardly on the sides of the container for longer periods of time.

This construction of the container and ribs in combination with the cutters accomplishes several unexpected results. In the first place all conventional liquefiers aerate the mix regardless of the amount of liquid in the container. In the present invention, if the starting amount of liquid in the container is above the half full mark there will be no aeration of the mixture. Thus aeration when undesirable can be eliminated by starting with a large amount of liquid. On the other hand if aeration is desired in a large amount of liquid it can be aerated by starting with a small amount of liquid and adding to it until the full amount is present.

Furthermore whether or not the liquid is being aerated or mixed without aeration, the container can be filled almost to the top without spilling.

When aerating, the motor, being a series wound motor, runs faster than when aeration is not present and this may assist in the desirable result of liquifying without aeration when desired, particularly when the device is used for laboratory work as well as culinary operations. However the speed with which liquefication is accomplished is not slowed nor are unliquefied particles prone to collect on top of the mix with or without aeration.

Otherwise it is obvious that the invention provides a very rugged container which can withstand long and hard use even to cutting up ice cubes without danger of strains or operations breaking or shattering the container.

By way of example and not by way of limiting the invention it has been found that a container having the following dimensions are particularly capable of the results mentioned, to wit, with a container 8" high and 4" square at the top, minor ribs 46, which are 6" long and about 5/16" high have been quite satisfactory, the rest of the device being in proportion as shown in the drawings.

Figure 4:
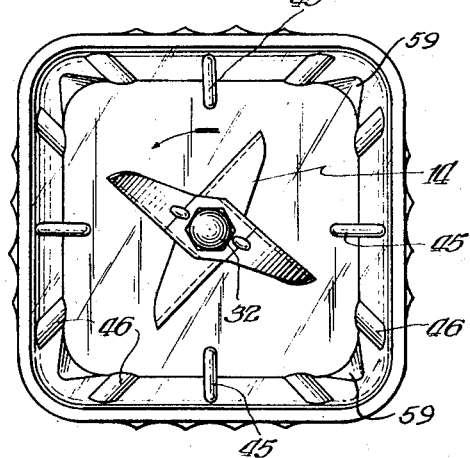
Fig. 4 is an enlarged, top plan view of the same container.

As shown in Fig. 4, tapered fillets 59 about 2" high are provided in the corners to assist in cleaning, and although the bottom wall of the container could be made to be removable from the side walls for purposes of ease in cleaning it has been found that this is unnecessary with the construction as shown and avoids leaking joints and the danger that the blades might be run some time without the sidewalls serving as guards.

From the foregoing it will be appreciated that a very superior liquifier has been provided, which is not only easier to operate but also performs functions and accomplishes results not performed by prior devices as set forth in the objects and description. Accordingly various changes or modifications such as will present themselves to those familiar with the art may be made without departing from the spirit of this invention, the scope of which is commensurate with the following claims.

We claim:

1. A container for use in liquifier apparatus, comprising an elongated hollow body having side walls equipped at one end with a bottom wall extending thereacross and at the other end thereof being adapted to receive a cover, a plurality of primary ribs projecting inwardly from said side walls and being spaced apart thereabout, a plurality of secondary ribs projecting inwardly from said side walls intermediate said primary ribs, said ribs extending upwardly from said bottom wall to adjacent the opposite end portion of the side walls and the primary ribs having a substantially greater inward projection than that of the secondary ribs, and cutter blades positioned within said hollow body adjacent said bottom wall and being rotatable with respect thereto, said hollow body having a generally square-shaped configuration to define a plurality of corners, in which said primary ribs are oriented medially of the respective side walls, and in which a pair of secondary ribs are provided for each corner of the hollow body and are oriented one on each side thereof.

2. A container for use in liquifier apparatus, comprising an elongated hollow body having side walls equipped at one end with a bottom wall extending thereacross and at the other end thereof being adapted to receive a cover, a plurality of primary ribs projecting inwardly from said side walls and being spaced apart thereabout, a plurality of secondary ribs projecting inwardly from said side walls intermediate said primary ribs, said ribs extending upwardly from said bottom wall to adjacent the opposite end portion of the side walls and the primary ribs having a substantially greater inward projection than that of the secondary ribs, cutter blades positioned within said hollow body adjacent said bottom wall and being rotatable with respect thereto, said hollow body having a generally square-shaped configuration to define a plurality of corners, in which said primary ribs are oriented medially of the respective side walls, and in which a pair of secondary ribs are provided for each corner of the hollow body and are oriented one on each side thereof, and a shallow fillet provided at each corner of said body adjacent the bottom wall thereof and intermediate the secondary ribs adjacent thereto.

References Cited in the file of this patent

UNITED STATES PATENTS

| | | |
|---|---|---|
| 354,572 | Norton | Dec. 21, 1886 |
| 535,566 | Waterson | Mar. 12, 1895 |
| 2,109,501 | Osius | Mar. 1, 1938 |
| 2,156,421 | Austria | May 2, 1939 |
| 2,203,672 | Chester | June 11, 1940 |
| 2,304,476 | Poplawski | Dec. 8, 1942 |
| 2,352,232 | Strauss | June 27, 1944 |
| 2,576,802 | Morris | Nov. 27, 1951 |
| 2,585,255 | Kochner et al. | Feb. 12, 1952 |

FOREIGN PATENTS

| | | |
|---|---|---|
| 599,568 | Great Britain | Mar. 16, 1948 |